United States Patent Office 3,163,654
Patented Dec. 29, 1964

3,163,654
PYRIDINE DERIVATIVES AND THEIR PREPARATION (N - TERTIARY AMINOALKYL - N - ACYL)-AMINO PYRIDINES
Rudolf Hiltmann, Hartmund Wollweber, Friedrich Hoffmeister, and Wolfgang Wirth, Wuppertal-Elberfeld, and Hans-Gunther Kroneberg, Haan, Rhineland, Germany, assignors to Farbenfabriken Bayer Aktiengesellschaft, Leverkusen, Germany, a corporation of Germany
No Drawing. Filed Apr. 10, 1962, Ser. No. 186,312
Claims priority, application Germany Apr. 13, 1961
7 Claims. (Cl. 260—294)

The present invention relates to pyridine derivatives and their preparation and more particularly to such derivatives which are useful as strongly active analgetics.

It is known that 4-methyl-2-aminopyridine has sympathomimetic properties and has shown, in animal experiments, some analgetic activity which cannot, however, always be reproduced with certainty. N-alkylated 2-aminopyridines such as e.g. 2-[N-(2-phenyl-2-hydroxyethyl)]-amino-pyridine, also act analgetically. Nothing has hitherto been known, however, of the pain relieving properties of N-alkylamino-pyridines basically substituted in the side chain, such as are used as intermediates in the production of antihistamines.

It has now surprisingly been found that strongly active analgetics are obtained when N-alkylaminoalkylaminopyridines of the formula

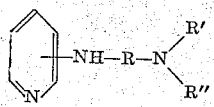

are converted by acylation into acylaminopyridines of the formula:

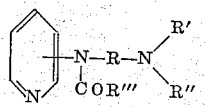

wherein R is a straight or branched alkylene radical of 2–5 carbon atoms, R' is a saturated or unsaturated alkyl radical of 1–4 carbon atoms, and a lower aralkyl radical, R' with R" or R and the adjacent nitrogen atom form a 5- or 6-membered heterocyclic ring, and R''' is a lower aliphatic, cycloaliphatic, araliphatic, aromatic or heterocyclic radical, or a lower alkoxy group which can be substituted by halogen atoms, lower alkyl, alkoxy, carbalkoxy, or carboxamido groups. Compared with the known, likewise analgetic N - [2 - (methylphenylethylamino)-propyl]- and N-(1-methyl - 2 - piperidinoethyl)-propionanilides, the aminopyridine derivatives here described have the important advantage of lower toxicity.

The preparation of N - acyl-N-alkylaminoalkylamino-pyridines of the present invention is carried out by treatment of the corresponding N - alkylaminoalkyl-amino-pyridines with selected acylating agents, such as e.g. with aliphatic, alicyclic, araliphatic, aromatic or heterocyclic carboxylic acid halides or anhydrides, with haloformic acid alkyl esters or pyrocarbonic acid alkyl esters, which may be substituted by halogen atoms, lower alkyl, alkoxy, carbalkoxy, or carboxamido groups. The N-acyl compounds obtained are mainly oils distillable under vacuum, which form water-soluble salts with pharmacologically acceptable inorganic or organic acids such as hydrochloric acid, sulphuric acid, phosphoric acid, nitric acid, methanesulphonic acid, acetic acid, succinic acid, glutaric acid, maleic acid, fumaric acid, tartaric acid, citric acid, or mandelic acid.

To the extent that the N-alkylaminoalkyl-amino-pyridines used as starting materials are not yet known or described, they can readily be obtained by alkylation of aminopyridines with the alkylaminoalkyl halides in the presence of sodamide.

The invention is illustrated by the following non-limitative examples.

Example I 19.2 g. of 2-(2-pyrrolidinoethyl)-aminopyridine and 50 ml. of propionic anhydride are heated to 120° C. for 8 hours, the mixture is then evaporated under vacuum and the residue taken up in water. The base is precipitated from the solution with a caustic soda solution, taken up in ether and dried with potassium carbonate. After driving off the ether and distillation under vacuum, 16 g. of N-propionyl-2-(2-pyrrolidinoethyl)-aminopyridine of B. Pt. 154° C./0.9 mm. Hg are obtained. The hydrochloride melts at 154° C.

The 2 - (2 - pyrrolidinoethyl)-aminopyridine of B. Pt. 142–144° C. required as starting material can be produced by alkylation of 2-aminopyridine with 2-pyrrolidinoethyl chloride, in the presence of sodamide.

Example II 30 g. of 2-(1-piperidino-isopropyl)-aminopyridine and 50 ml. of acetic anhydride are heated to 120° C. for 8 hours and worked up according to the manner described in Example 1. 25.2 g. of N-acetyl-2-(1-piperidino-isopropyl)-aminopyridine are obtained of B. Pt. 143° C./0.3 mm. Hg.

The 2-(1-piperidino-isopropyl)-aminopyridine of B. Pt. 158–160° C./3 mm. Hg required as starting material can be produced by alkylation of 2-aminopyridine with 1-piperidino-isopropyl chloride in the presence of sodamide.

In the same way, there are obtained from 20 g. of 2-(1-piperidino-isopropyl)-aminopyridine and 50 ml. of propionic anhydride, 18 g. of N-propionyl-2-(1-piperidino-isopropyl)-aminopyridine of B. Pt. 162–163° C./$_{0.5\text{ mm. Hg}}$; from 21.9 g. of 2-(1-piperidino-isopropyl)-aminopyridine and 50 ml. of α-methylbutyric anhydride, 22.7 g. of N-α-methyl-butyroyl-2-(1-piperidino-isopropyl) - aminopyridine of B. Pt. 161–163° C./0.15 mm. Hg; from 21.9 g. of 2-(1-piperidino-isopropyl)-aminopyridine and 50 ml. of methoxyacetic anhydride, 20.6 g. of N-methoxyacetyl-2-(1-piperidino-isopropyl)-aminopyridine of B. Pt. 180–182° C./0.4 mm Hg; from 21.9 g. of 2-(1-piperidino-isopropyl)-aminopyridine and 50 ml. of ethoxyacetic anhydride, 21.5 g. of N-ethoxyacetyl-2-(1-piperidino-isopropyl)-aminopyridine of B. Pt. 170° C./0.2 mm. Hg.

Example III

To 30 g. of 2-(1-piperidino-isopropyl)-aminopyridine in 30 ml. tetrahydrofuran, 25 g. of pyrocarbonic acid ethyl ester are added dropwise and boiled under reflux for 6 hours. The solvent and excess pyrocarbonic acid ethyl ester are distilled off under vacuum, and the product is worked up in the manner described in Example I, yielding 28 g. of N-carboxyethyl-2-(1-piperidino-isopropyl)-aminopyridine of B. Pt. 143° C./0.3 mm. Hg.

Example IV 12 g. of 2-[1-(N-β-phenethyl-N-methylamino)-isopropyl]-aminopyridine and 50 ml. of propionic anhydride are heated to 100° C. for 8 hours and then worked up in the manner described in Example I. 12.9 g. of N-propionyl - 2 - [1 - (N-β-phenethyl-N-methylamino)-isopropyl]-aminopyridine of B. Pt. 200–205° C./0.3 mm. Hg are obtained. The dihydrochloride melts at 121–122° C. with decomposition.

The 2 - [1-(N-β-phenethyl-N-methylamino)-isoproyl]-aminopyridine of B. Pt. 178–182° C./0.3 mm. Hg required as starting material is obtained in the usual way from α-aminopyridine and 1-(N-β-phenethyl-N-methyl-amino)-isopropyl chloride in the presence of sodamide.

Example V 15.5 g. of benzoyl chloride are added dropwise with ice cooling to a solution of 21.9 g. of 2-(1-piperidino-isopropyl)-aminopyridine in 50 ml. of toluene and subsequently heated to 120° C. for 1.5 hours. After cooling, the mixture is stirred with 50 ml. of water, the toluene solution separated and washed with about 1 N hydrochloric acid. The combined aqueous solutions were washed with benzene. The base is precipitated with a potassium carbonate solution, taken up in either and dried with solid potassium carbonate. After driving off the solvent and distillation under vacuum, 23.5 g. of N-benzoyl-2-(1-piperidino-isopropyl)-aminopyridine of B. Pt. 196–198° C./0.5 mm. Hg are obtained.

In the same way there are obtained from 21.9 g. of 2-(1-piperidino-isopropyl)-aminopyridine and 17 g. of phenylacetic acid chloride, 16 g. of N-phenacetyl-2-(1-piperidino-isopropyl)-aminopyridine of B. Pt. 200° C./0.45 mm. Hg, from 21.9 g. of 2-(1-piperidino-isopropyl)-aminopyridine and 16.5 g. of tetrahydropyran-2-carboxylic acid chloride, 26 g. of N-tetrahydropyran-2-carbonyl-2-(1-piperidino-isopropyl)-aminopyridine of B. Pt. 204° C./0.6 mm. Hg; from 21.9 g. of 2-(1-piperidino-isopropyl)-aminopyridine and 17.5 g. of hexahydrobenzoyl chloride, 26.4 g. of N-hexahydrobenzoyl-2-(1-piperidino-isopropyl)-aminopyridine of B. Pt. 202° C./0.4 mm. Hg.

Example VI 20 g. of 3-(1-piperidino-isopropyl)-aminopyridine and 50 ml. of propionic anhydride are heated to 100° C. for 8 hours and then worked up in the way described in Example I. 13.5 g. of N-propionyl-3-(1-piperidino-isopropyl)-aminopyridine of B. Pt. 168–170° C./0.5 mm. Hg are obtained.

The 3-(1-piperidino-isopropyl)-aminopyridine of 154–156° C./0.35 mm. Hg required as starting material can be produced by alkylating 3-aminopyridine with 1-piperidino-isopropyl chloride in the presence of sodamide.

Example VII

According to the method described in Example I there are obtained from 20 g. of 4-(1-piperidino-isopropyl)-aminopyridine and 50 ml. of propionic anhydride, 13.5 g. of N-propionyl-4-(1-piperidino-isopropyl)-aminopyridine of B. Pt. 168–170° C./0.5 mm. Hg.

This 4-(1-piperidino-isopropyl)-aminopyridine of M. Pt. 73–75° C. required as starting material can be obtained by alkylating 4-aminopyridine with 1-piperidino-isopropyl chloride in the presence of sodamide.

Example VIII

In the manner described in Example I there are obtained from 20 g. of 2-(2-(N,N-diethylamino)-ethyl)aminopyridine and 20 ml. of propionic anhydride, 15.3 g. of N-propionyl-2-(2-(N,N-diethylamino)-ethyl)-aminopyridine of B. Pt. 130–132° C./0.5 mm. Hg.

The 2-(2-(N,N-diethylamino-ethyl)-aminopyridine of B. Pt. 104–106° C./0.2 mm. Hg required as starting material can be produced by alkylating 2-aminopyridine with 2-N,N-diethylaminoethyl chloride in the presence of sodamide.

Example IX

In the manner described in Example I there is obtained from 20 g. of 2-(3-(N,N-dimethylamino)-propyl)-aminopyridine and 50 ml. of propionic anhydride, 17.1 g. of N-propionyl-2-(3-(N,N-dimethylamino)-propyl)-aminopyridine of B. Pt. 138–140° C./0.2 mm. Hg.

The 2-(3-(N,N-dimethylamino)-propyl)aminopyridine of B. Pt. 110–112° C./0.4 mm. Hg required as starting material can be produced by alkylation of 2-aminopyridine with 3-(N,N-dimethyl-amino)-propyl chloride in the presence of sodamide.

What is claimed is:
1. N-propionyl-2-(2-pyrrolidinoethyl)-aminopyridine.
2. N-acetyl-2-(1-piperidino-isopropyl)-aminopyridine.
3. N-propionyl-2-(1-piperidino-isopropyl)-aminopyridine.
4. N-propionyl-2-[1-(N-β-phenethyl-N-methyl amino)-isopropyl]-aminopyridine.
5. N-propionyl-3-(1-piperidino-isopropyl)-aminopyridine.
6. N-propionyl-4-(1-piperidino-isopropyl)-aminopyridine.
7. A compound selected from the group consisting of an acylaminopyridine and its pharmaceutically acceptable nontoxic acid salts, said acylaminopyridine having the formula:

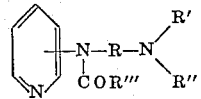

in which
R is selected from the group consisting of

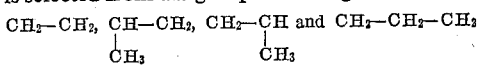

R′ is selected from the group consisting of methyl, ethyl, benzyl and phenyl ethyl;
R″ is selected from the group consisting of methyl and ethyl;
R′ and R″ together with the adjacent nitrogen atom form a member selected from the group consisting of pyrrolidino and piperidino; and
R‴ is selected from the group consisting of acetyl, propionyl α-methylbutyryl, methoxy acetyl and ethoxy acetyl.

References Cited in the file of this patent
UNITED STATES PATENTS 1,886,481     Hartmann et al.            Nov. 8, 1932

UNITED STATES PATENT OFFICE
CERTIFICATE OF CORRECTION

Patent No. 3,163,654      Dated December 29, 1964

Inventor(s) RUDOLF HILTMANN et al.

It is certified that error appears in the above-identified patent and that said Letters Patent are hereby corrected as shown below:

In claim 7, the formula should appear as follows:

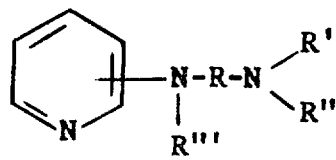

Signed and sealed this 27th day of June 1972.

(SEAL)
Attest:

EDWARD M. FLETCHER, JR.
Attesting Officer

ROBERT GOTTSCHALK
Commissioner of Patents